(12) United States Patent
Dietz et al.

(10) Patent No.: US 10,913,345 B2
(45) Date of Patent: Feb. 9, 2021

(54) DRIVE SYSTEM FOR MOTOR VEHICLES

(71) Applicant: Voith Patent GmbH, Heidenheim (DE)

(72) Inventors: Volker Dietz, Gerstetten (DE); Lidija Gotic-Patzak, Heidenheim (DE); Martin Strobl, Heidenheim (DE); Gregor Polifke, Giengen (DE); Rainer Schütz, Neresheim (DE); Marco Toneatto, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 16/358,111

(22) Filed: Mar. 19, 2019

(65) Prior Publication Data

US 2019/0210450 A1    Jul. 11, 2019

Related U.S. Application Data

(63) Continuation of application No. PCT/EP2017/071965, filed on Sep. 1, 2017.

(30) Foreign Application Priority Data

Sep. 21, 2016 (DE) .......................... 10 2016 218 104

(51) Int. Cl.
   *B60K 6/40* (2007.10)
   *B60K 6/48* (2007.10)
   (Continued)

(52) U.S. Cl.
   CPC .................. *B60K 6/40* (2013.01); *B60K 6/26* (2013.01); *B60K 6/36* (2013.01); *B60K 6/38* (2013.01);
   (Continued)

(58) Field of Classification Search
   CPC .... B60K 6/40; B60K 6/38; B60K 2006/4825; H02K 7/006; H02K 7/02
   See application file for complete search history.

(56) References Cited

U.S. PATENT DOCUMENTS

| | | |
|---|---|---|
| 6,340,339 B1 | 1/2002 | Tabata et al. |
| 6,424,126 B1 | 7/2002 | Ohsawa |

(Continued)

FOREIGN PATENT DOCUMENTS

| | | |
|---|---|---|
| DE | 197 04 769 A1 | 8/1998 |
| DE | 100 02 206 A1 | 8/2001 |

(Continued)

OTHER PUBLICATIONS

Notice of Transmission of the International Research Report and the Written Notice Issued the International Searching Authority or Declaration dated Nov. 28, 2017 for International Application No. PCT/EP2017/071965 (12 pages).

(Continued)

*Primary Examiner* — Brian L Swenson
(74) *Attorney, Agent, or Firm* — Taylor IP, P.C.

(57) ABSTRACT

A drive system including a drive motor having a crank shaft, a flywheel element arranged on the crankshaft, a damper which is directly or indirectly coupled on the primary side with flywheel element, a transmission assembly having a transmission input shaft which has a hollow shaft region and a transmission output shaft, a multiple clutch device arranged in between the transmission input shaft and the transmission output shaft, and an electric machine arranged in between the flywheel element and the multiple clutch device.

20 Claims, 2 Drawing Sheets

(51) Int. Cl.
- B60K 6/387 (2007.10)
- B60K 6/485 (2007.10)
- B60K 6/26 (2007.10)
- B60K 6/36 (2007.10)
- B60K 6/38 (2007.10)
- H02K 5/24 (2006.01)
- H02K 7/00 (2006.01)
- H02K 7/02 (2006.01)
- H02K 7/108 (2006.01)
- F16F 15/12 (2006.01)

(52) U.S. Cl.
CPC ............... B60K 6/387 (2013.01); B60K 6/48 (2013.01); B60K 6/485 (2013.01); H02K 5/24 (2013.01); H02K 7/006 (2013.01); H02K 7/02 (2013.01); H02K 7/108 (2013.01); *B60K 2006/4825* (2013.01); *B60Y 2200/92* (2013.01); *F16F 15/12* (2013.01); *H02K 2201/12* (2013.01); *Y02T 10/62* (2013.01)

(56) References Cited

U.S. PATENT DOCUMENTS

| | | | |
|---|---|---|---|
| 7,191,856 B2* | 3/2007 | Morishita | B60K 6/26 180/65.21 |
| 7,661,495 B2 | 2/2010 | Zöhrer et al. | |
| 8,701,808 B2 | 4/2014 | Zhu et al. | |
| 9,222,524 B2* | 12/2015 | Saito | B60K 6/387 |
| 2005/0012486 A1* | 1/2005 | Crain | H02P 6/34 318/719 |
| 2008/0023287 A1 | 1/2008 | Thiede et al. | |
| 2008/0051249 A1 | 2/2008 | Maenner et al. | |
| 2013/0079193 A1 | 3/2013 | Dhnemus et al. | |
| 2014/0202278 A1* | 7/2014 | Murata | F16F 15/126 74/574.4 |
| 2014/0342873 A1* | 11/2014 | Inoue | B60W 20/40 477/5 |
| 2016/0111986 A1* | 4/2016 | Vollmer | H02K 11/21 318/400.23 |
| 2018/0126837 A1* | 5/2018 | Gorges | B60K 6/48 |
| 2018/0362020 A1* | 12/2018 | Kobler | B60K 6/30 |
| 2019/0190334 A1* | 6/2019 | Payne | H02K 1/28 |
| 2019/0308496 A1* | 10/2019 | Reimnitz | F16D 21/08 |
| 2020/0063804 A1* | 2/2020 | Reimnitz | B60W 10/023 |

FOREIGN PATENT DOCUMENTS

| | | |
|---|---|---|
| DE | 10 2007 021 015 A1 | 1/2009 |
| EP | 2 162 643 B1 | 3/2012 |

OTHER PUBLICATIONS

German Office Action dated Jun. 2017 for German Application No. 10 2016 218 104.1 (5 pages).

* cited by examiner

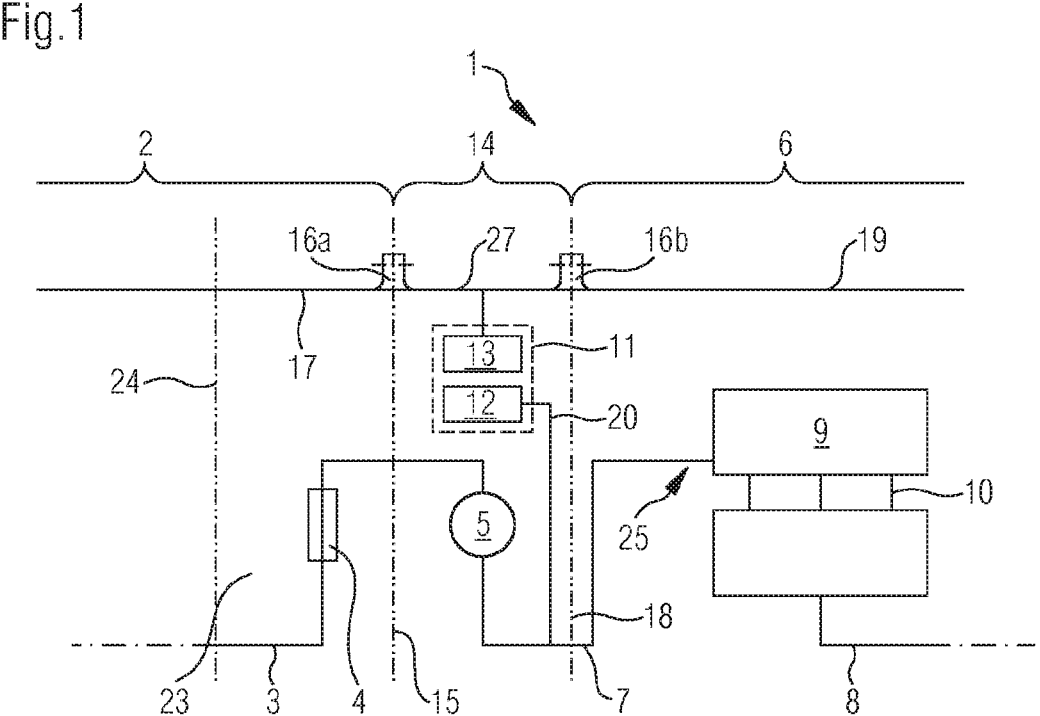
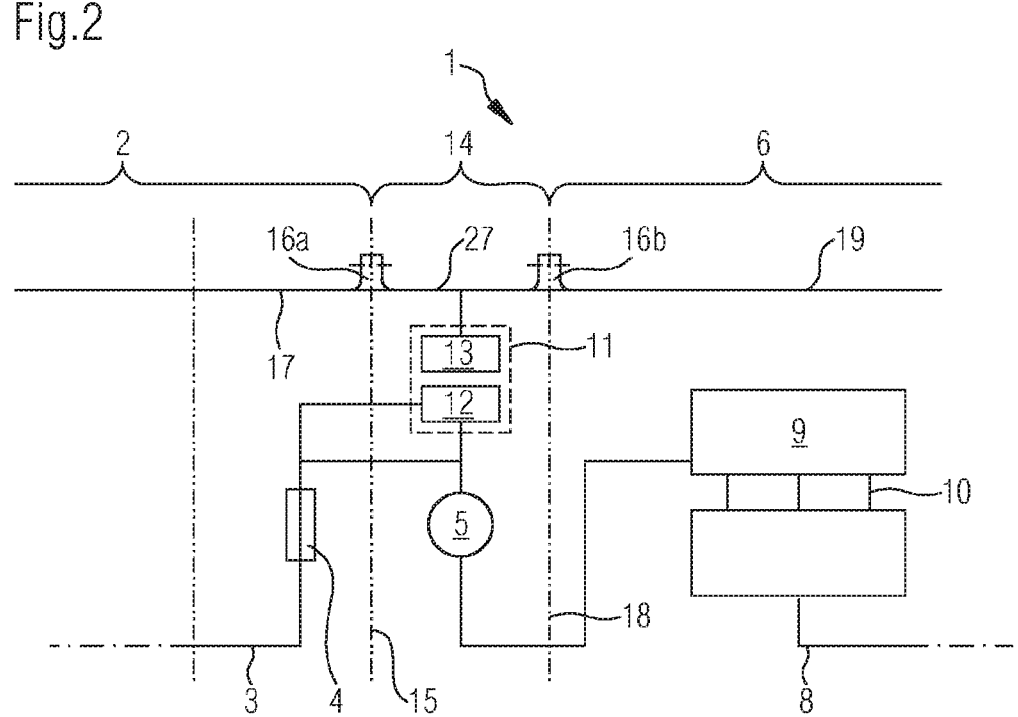

DRIVE SYSTEM FOR MOTOR VEHICLES

CROSS REFERENCE TO RELATED APPLICATIONS

This is a continuation of PCT application No. PCT/EP2017/071965, entitled "DRIVE SYSTEM FOR MOTOR VEHICLES", filed Sep. 1, 2017, which is incorporated herein by reference.

BACKGROUND OF THE INVENTION

1. Field of the Invention

The present invention relates to a drive system, and, more particularly to a drive system for a motor vehicle.

2. Description of the Related Art

A drive system of a motor vehicle generally includes a drive motor or more specifically a combustion engine, having a crankshaft, a flywheel element arranged on the crankshaft, a damper which is directly or indirectly coupled on the primary side with the flywheel, and a transmission assembly. The transmission assembly has a transmission input shaft and a transmission output shaft, wherein the transmission input shaft is coupled to the secondary side of the damper and wherein a multiple clutch device is arranged between the transmission input shaft and the transmission output shaft.

The transmission assembly can be an automatic transmission with different power paths that are switchable, which can also lead through a hydrodynamic converter. A transmission of this type is illustrated and described in EP 2 162 643 B1. The disclosed transmission input shaft includes a hollow shaft region in which a multiple clutch device is arranged which is coupled on the primary side rotationally fixed with the transmission input shaft.

By shifting a clutch in the multiple clutch unit, the input planetary gear sets are electively connected with the drive motor. The housing of such an automatic transmission is generally connected directly by way of a flange connection with the housing of the drive motor to create a power train.

What is needed in the art is an alternative coupling scheme for a drive system.

SUMMARY OF THE INVENTION

The present invention provides a drive system which permits integration of an electric motor into the power train and features a modular design.

According to the present invention, a drive system, specifically for a motor vehicle is suggested, including a drive motor having a crank shaft, a flywheel element arranged on the crankshaft, a damper which is coupled on the primary side with the flywheel, and a transmission assembly. The transmission assembly has a transmission input shaft which has a hollow shaft region, and a transmission output shaft, wherein the transmission input shaft is coupled to the secondary side of the damper and wherein a multiple clutch device is arranged between the transmission input shaft and the transmission output shaft. According to the present invention it is suggested to provide an electric machine (E-machine) between the flywheel element or more specifically the flywheel and the multiple clutch device. The rotor of the electric machine is coupled with the drive motor in such a manner that the rotor rotates at all times with the speed of the drive motor.

The present invention also provides a method for operating a motor vehicle. The method includes an initial step of providing a drive system for the motor vehicle. The drive system including a drive motor having a crank shaft, a flywheel element arranged on the crankshaft, a damper having a primary side and a secondary side, the primary side of the damper is one of directly and indirectly coupled with the flywheel element, a transmission assembly having a transmission input shaft and a transmission output shaft, the transmission input shaft has a hollow shaft region and is coupled with the secondary side of the damper, a multiple clutch device arranged in between the transmission input shaft and the transmission output shaft, and an electric machine arranged in between the flywheel element and the multiple clutch device, the electric machine has a rotor that is coupled with the drive motor in such a manner that the rotor rotates at all times with a speed of the drive motor. The method further includes the steps of operating the drive motor and generating energy, by the electric machine, and one of: constantly supplying the generated energy to an on-board power supply, supporting a shifting operation in the transmission assembly, influencing the speed of the drive motor by supplying the generated energy back to the drive motor, and supplying the generated energy to provide a stop-start function of the drive motor.

The arrangement of the electric machine in this position facilitates all customary operational modes of a hybrid power train and in addition provides for a simple modular design, which also facilitates retrofitting of an electric machine. The electric machine can be operated as a motor or a generator.

Direct coupling of the electric machine ensures, for example, that generative energy is supplied constantly to the on-board power supply, as soon as the combustion engine runs. However, motoric operation of the E-machine is also conceivable in order to, for example, support the shifting operation in the automatic transmission or to influence the speed of the drive motor. The E-machine can moreover be used for the stop-start function.

It can moreover be provided that the rotor of the electric machine is directly or indirectly coupled with the transmission input shaft. Thus, the rotor of the electric machine can also be coupled directly with the secondary side of the damper. With this arrangement, the electric machine is also decoupled from the vibrations of the drive motor.

Alternatively, it may be provided that the rotor of the electric machine is coupled directly or indirectly with the crankshaft of the drive motor. For example, the rotor of the electric machine can be coupled directly or indirectly on the primary side with the damper. With this arrangement of the electric machine, the transmission input is decoupled from each drive-side related vibration.

It can further be provided that the electric machine is disposed radially outside the damper, wherein the damper is positioned completely within the axial extension of the electric machine. The electric machine and the damper may be arranged in an intermediate housing of an intermediate module which can be connected via a flange connection with the drive motor housing and via a flange connection with the transmission housing. The flange connections are located in connection planes of the drive system and facilitate a simple modular design of the drive system.

The multiple clutch device can include several separate clutch units whose primary sides are coupled with the transmission input shaft.

The rotor may be arranged on a rotor support, wherein the rotor support has a pulse generator which is adapted to determine the position of the rotor support or more specifically the rotor by way of a pole position sensor.

The damper may include a hydrodynamic damping system.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 illustrates a first embodiment of the drive system;

FIG. 2 illustrates a second embodiment of the drive system; and

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 3A:
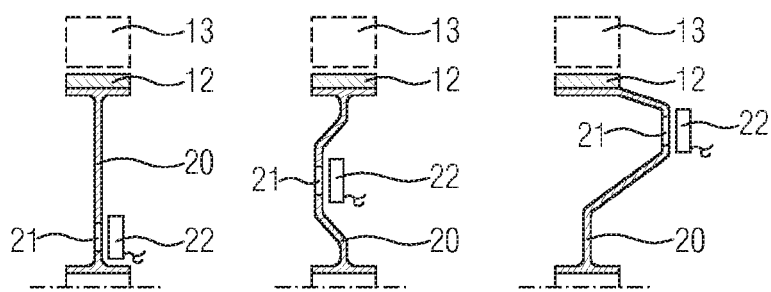
FIGS. 3a-3b illustrate a position detection device for rotor carrier or support designs.

Referring now to the drawings, and more particularly to FIGS. 1-2, there is shown two embodiments of the drive system 1 according to the present invention. Both embodiments have a common basic structure. This basic structure of the drive system 1 includes three functional areas—drive motor 2 with its transmission housing, intermediate module 14 with its intermediate housing 27, and transmission assembly 6 with transmission housing 19. In connection planes 15 and 18, the three housings 17, 27 and 19 are interconnected into one unit, wherein a housing space 23 for flywheel element 4 and the interior space of intermediate housing 27 create an oil-free space which is enclosed relative to the oil circuits in drive motor 2 and in transmission 6.

Only crank shaft 3 of drive motor 2 protrudes through parting planes 24 from enclosed transmission housing 17. Flywheel element 4 is arranged on crank shaft 3, or more specifically is rotationally fixed connected therewith. Damper 5 is connected with its primary side to flywheel element 4. On the secondary side, damper 5 is coupled with transmission shaft 7 of transmission 6.

Transmission 6 is an automatic transmission having a transmission input shaft 7 comprising a hollow shaft region 25. By way of multiple clutch device 9 which includes a plurality of clutch units 10 the planetary gear sets which are not illustrated here can be shifted in such a manner, that the desired ratio occurs on transmission output shaft 8. Also not illustrated are the converter, retarder, clutches and at least one additional planetary gear set in the subsequent transmission region, as described in EP 2 162 643 B1.

Another common feature of the two drive systems is the arrangement of electric machine 11 relative to damper 5. In both cases, electric machine 11 is disposed radially outside damper 5, wherein damper 5 is positioned completely within the axial extension of electric machine 11.

The difference between the two embodiments in FIG. 1 and FIG. 2 is the arrangement of electric machine 11 in the coupling structure.

In FIG. 1, rotor 12 is mounted rotationally fixed via a rotor support 20 on transmission input shaft 7. With this layout, rotor support 20 and rotor 12 increase the drive-side rotating masses, so that the natural frequency is reduced in the case of a 2-mass torsional vibration. This improves smooth operation, especially at low speeds or high torque and the distance to resonance frequency is increased.

A second arrangement is also conceivable wherein an additional disconnect device is located between drive motor and rotor of the electric machine. This disconnect device allows separation of drive motor and electric machine, so that for example also a strictly electrical drive is possible with which the entire transmission ratio range of the transmission can be utilized.

In FIG. 2, rotor 12 is integrated into the coupling structure on the primary side of damper 5, between flywheel element 4 and damper 5. Several connections are illustrated figuratively, wherein in practice the rotor support can be used as a connecting element between flywheel element 4, rotor 12 and damper 5.

In both coupling structures, electric machine 11 is coupled with drive motor 2 in such a manner that rotor 12 always rotates at the speed of drive motor 2. Alternatively, a disconnect device which is not illustrated, can be arranged between drive motor 2 and rotor 12 of electric machine 11, so that decoupling of the drive motor is possible.

Figure 3B:
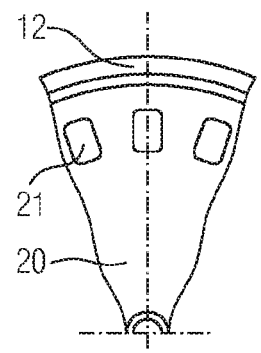

FIGS. 3a and 3b address the position detection device that is necessary for the operation of the electric machine 11. For this purpose, rotor support 20 comprises a pulse generator 21 which is suitable for detecting the position of rotor support 20 or specifically of rotor 21 by way of a pole position sensor 22. When using a pole position sensor 22, the rotor support can be adapted very easily to the various conditions.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LIST

1 Drive system
2 Drive motor
3 Crank shaft
4 Flywheel element
5 Damper
6 Transmission assembly
7 Transmission input shaft
8 Transmission output shaft
9 Clutch device
10 Clutch units
11 Electric machine
12 Rotor
13 Stator
14 Intermediate module
15 Connecting plane
16a, 16b Flange connection
17 Drive motor housing
18 Connecting plane 19 Transmission housing
20 Rotor support
21 Pulse generator
22 Pole position sensor
23 Flywheel space
24 Disconnect plane
25 Hollow shaft region
26 Seal
27 Intermediate housing

What is claimed is:

1. A drive system for a motor vehicle, comprising:
   a drive motor having a crank shaft;
   a flywheel element arranged on the crankshaft;
   a damper having a primary side and a secondary side, the primary side of the damper is one of directly and indirectly coupled with the flywheel element;
   a transmission assembly having a transmission input shaft and a transmission output shaft, the transmission input shaft has a hollow shaft region and is coupled with the secondary side of the damper;
   a multiple clutch device arranged in between the transmission input shaft and the transmission output shaft; and
   an electric machine arranged in between the flywheel element and the multiple clutch device, the electric machine has a rotor that is coupled with the drive motor in such a manner that the rotor rotates at all times with a speed of the drive motor, the electric machine is configured for generating energy such that the electric machine one of constantly supplies the generated energy to an on-board power supply, supports a shifting operation in the transmission assembly, influences the speed of the drive motor by supplying the generated energy back to the drive motor, and supplies the generated energy to provide a stop-start function of the drive motor.

2. The drive system according to claim 1, wherein the rotor of the electric machine is one of directly and indirectly coupled with the transmission input shaft.

3. The drive system according to claim 2, wherein the rotor of the electric machine is coupled with the secondary side of the damper.

4. The drive system according to claim 1, wherein the rotor of the electric machine is one of directly and indirectly coupled with the crank shaft.

5. The drive system according to claim 4, wherein the rotor of the electric machine is one of directly and indirectly coupled with the primary side of the damper.

6. The drive system according to claim 1, wherein the electric machine is disposed radially outside the damper and has an axial extension, wherein the damper is positioned completely within the axial extension of electric machine.

7. The drive system according to claim 6, further comprising an intermediate module including an intermediate housing, a drive motor housing, and a transmission housing, wherein the electric machine and the damper are arranged in the intermediate housing of the intermediate module, and the intermediate module is connected via a flange connection with the drive motor housing and via a flange connection with the transmission housing.

8. The drive system according to claim 1, wherein the multiple clutch device includes several separate clutch units with primary sides that are coupled with the transmission input shaft.

9. The drive system according to claim 1, wherein the rotor is arranged on a rotor support, and wherein the rotor support has a position detection device including a pulse generating device which is adapted to determine a position of at least one of the rotor support and the rotor.

10. The drive system according to claim 9, wherein the position detection device further includes a pole position sensor for detecting the position of at least one of the rotor support and the rotor.

11. The drive system according to claim 1, wherein the damper includes a hydrodynamic damping system.

12. The drive system according to claim 1, wherein the electric machine is a transverse flux machine.

13. A method for operating a motor vehicle, comprising:
   providing a drive system for the motor vehicle, the drive system including a drive motor having a crank shaft, a flywheel element arranged on the crankshaft, a damper having a primary side and a secondary side, the primary side of the damper is one of directly and indirectly coupled with the flywheel element, a transmission assembly having a transmission input shaft and a transmission output shaft, the transmission input shaft has a hollow shaft region and is coupled with the secondary side of the damper, a multiple clutch device arranged in between the transmission input shaft and the transmission output shaft, and an electric machine arranged in between the flywheel element and the multiple clutch device, the electric machine has a rotor that is coupled with the drive motor in such a manner that the rotor rotates at all times with a speed of the drive motor;
   operating the drive motor; and
   generating energy, by the electric machine, and one of:
      constantly supplying the generated energy to an on-board power supply;
      supporting a shifting operation in the transmission assembly;
      influencing the speed of the drive motor by supplying the generated energy back to the drive motor; and
      supplying the generated energy to provide a stop-start function of the drive motor.

14. The method according to claim 13, wherein the rotor of the electric machine is one of directly and indirectly coupled with the transmission input shaft.

15. The method according to claim 14, wherein the rotor of the electric machine is coupled with the secondary side of the damper.

16. The method according to claim 13, wherein the rotor of the electric machine is one of directly and indirectly coupled with the crank shaft.

17. The method according to claim 16, wherein the rotor of the electric machine is one of directly and indirectly coupled with the primary side of the damper.

18. The method according to claim 13, wherein the electric machine is disposed radially outside the damper and has an axial extension, wherein the damper is positioned completely within the axial extension of electric machine.

19. The method according to claim 18, further comprising an intermediate module including an intermediate housing, a drive motor housing, and a transmission housing, wherein the electric machine and the damper are arranged in the intermediate housing of the intermediate module, and the intermediate module is connected via a flange connection with the drive motor housing and via a flange connection with the transmission housing.

20. The method according to claim 13, wherein the multiple clutch device includes several separate clutch units with primary sides that are coupled with the transmission input shaft.

* * * * *

UNITED STATES PATENT AND TRADEMARK OFFICE
CERTIFICATE OF CORRECTION

PATENT NO. : 10,913,345 B2  
APPLICATION NO. : 16/358111  
DATED : February 9, 2021  
INVENTOR(S) : Dietz et al.

It is certified that error appears in the above-identified patent and that said Letters Patent is hereby corrected as shown below:

On the Title Page

Page 2, Column 2 Line 6 Item (56) Under U.S. PATENT DOCUMENTS, at patent 2013/0079193, please delete "Dhnemus et al.", and substitute therefore --Ohnemus et al.--.

Signed and Sealed this  
Twenty-fifth Day of October, 2022

Katherine Kelly Vidal  
*Director of the United States Patent and Trademark Office*